United States Patent
Lyons

(10) Patent No.: US 6,546,600 B1
(45) Date of Patent: Apr. 15, 2003

(54) CABLE CLAMP

(75) Inventor: John Lyons, Levittown, NY (US)

(73) Assignee: Duro Dyne Corporation, Bay Shore, NY (US)

( * ) Notice: Subject to any disclaimer, the term of this patent is extended or adjusted under 35 U.S.C. 154(b) by 0 days.

(21) Appl. No.: 10/008,961

(22) Filed: Dec. 7, 2001

(51) Int. Cl.$^7$ .............................................. F16G 11/04
(52) U.S. Cl. ................ 24/136 R; 24/136 L; 24/115 M; 403/409.1
(58) Field of Search ........................... 24/136 R, 136 A, 24/136 B, 115 R, 115 L, 115 M, 456, 569; 403/409.1, 396, 385; 294/102.1; 16/205

(56) References Cited

U.S. PATENT DOCUMENTS

| | | | |
|---|---|---|---|
| 206,169 A | * 7/1878 | Fayman ..................... 24/136 R |
| 1,139,515 A | 5/1915 | Haas |
| 1,139,595 A | 5/1915 | Starr |
| 1,271,912 A | 7/1918 | Kemper et al. |
| RE15,290 E | 5/1922 | Kemper et al. |
| 1,811,942 A | 6/1931 | Kemper et al. |
| 2,387,436 A | 10/1945 | Frank |
| 2,544,086 A | * 3/1951 | Herrington ................ 24/136 R |
| 2,983,012 A | 5/1961 | Madden |
| 3,215,395 A | * 11/1965 | Gorbar ..................... 24/136 R |
| 3,628,221 A | * 12/1971 | Pasbrig ..................... 24/136 L |
| 3,900,184 A | * 8/1975 | Burke et al. .............. 24/115 L |
| 3,927,441 A | 12/1975 | Anzini ........................ 24/136 |
| 3,984,081 A | * 10/1976 | Hoganson ................. 24/136 A |
| 4,129,927 A | 12/1978 | Anderson ..................... 24/136 |
| 4,216,568 A | 8/1980 | Anderson ..................... 24/136 |
| 4,266,756 A | 5/1981 | Anderson .................... 256/47 |
| 4,858,810 A | * 8/1989 | Intlekofer et al. ........ 24/115 M |
| 4,935,993 A | 6/1990 | Bree .......................... 24/136 |
| 5,147,145 A | 9/1992 | Facey et al. ................ 403/314 |
| 6,003,210 A | 12/1999 | Facey et al. .................. 24/130 |
| 6,058,574 A | 5/2000 | Facey et al. .................. 24/136 |

* cited by examiner

Primary Examiner—Victor Sakran
(74) Attorney, Agent, or Firm—Barry G. Magidoff; Paul J. Sutton

(57) ABSTRACT

A cable clamp of the spring biased wedge type incorporates a housing having an elongate slot formed therethrough, the slot being disposed in parallel relation to the direction of movement of the wedge in the housing. A retractor pin extends through the slot and is coupled to the wedge. The wedge may be shifted into cable releasing position by the application of compressive forces exerted between the portions of the pin projecting through the slot and an abutment portion or end of the housing. A simplified method of assembly includes interposing a spring between the wedge and the portion of the housing, shifting the wedge such that a blind bore in the wedge is aligned with the slot, and thereafter connecting a pin to the wedge as by press fitting, portions of the pin projecting outwardly through the slot to thereby capture the wedge and spring.

5 Claims, 5 Drawing Sheets

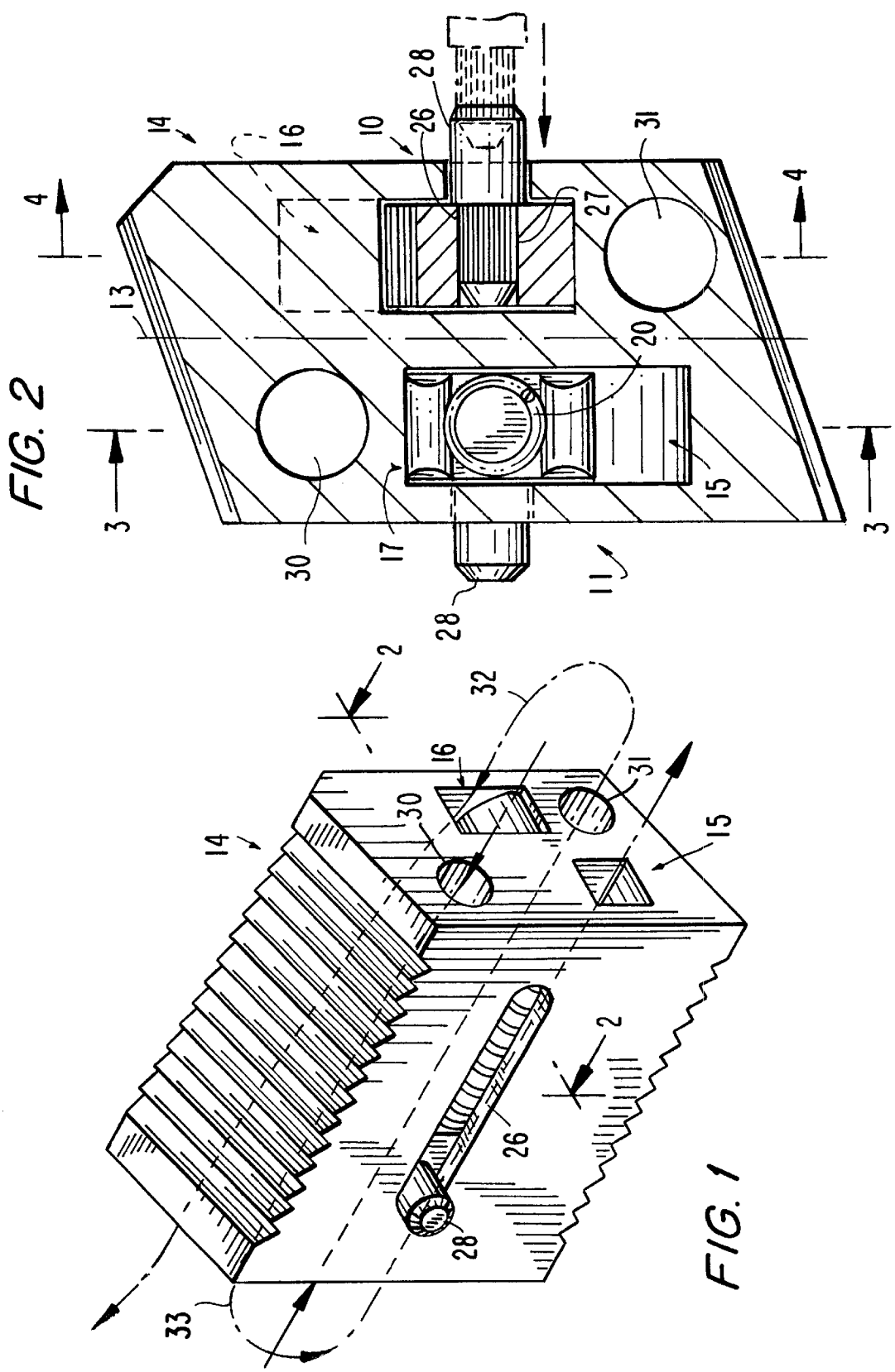

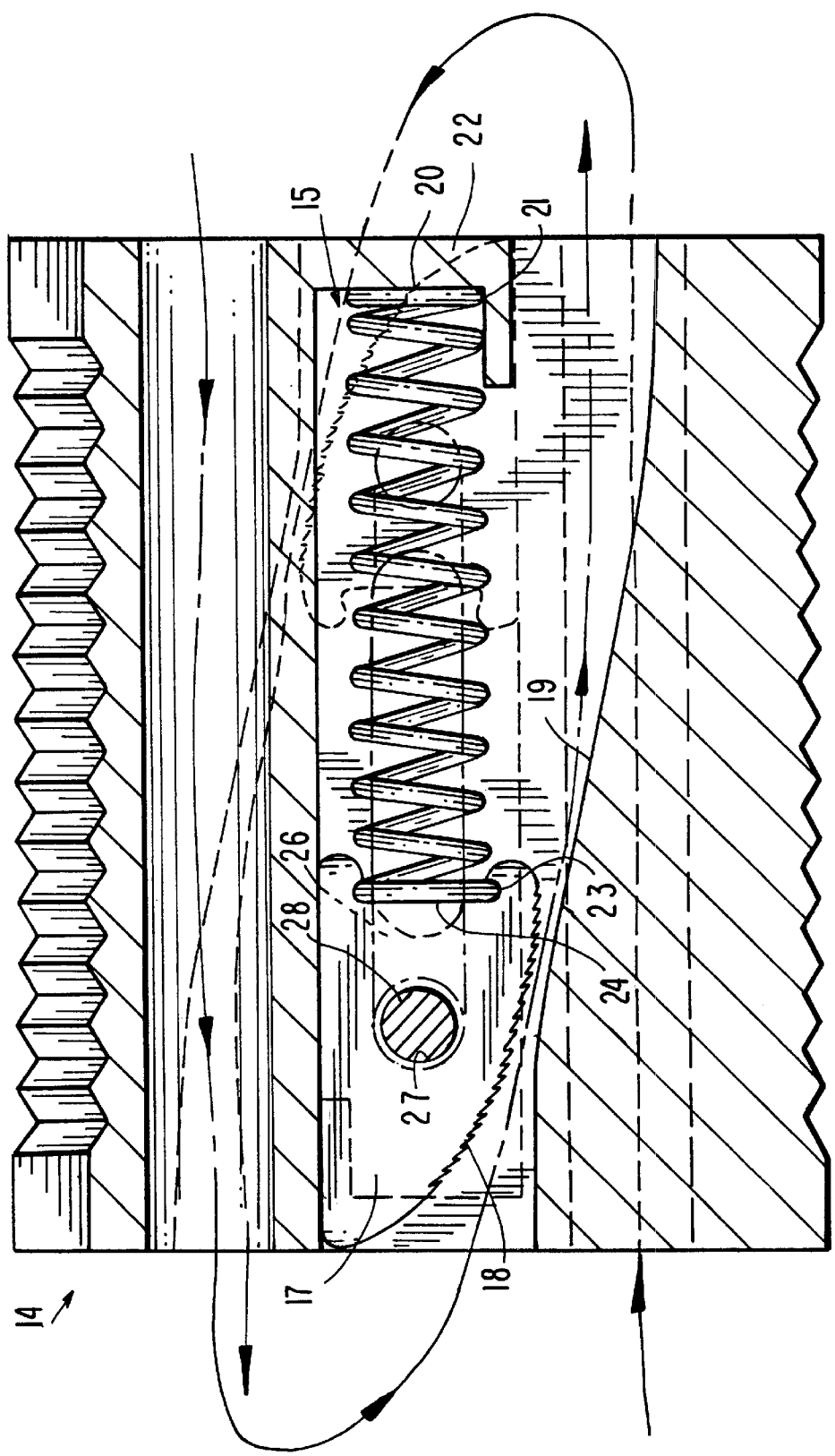

CABLE CLAMP

BACKGROUND OF THE INVENTION

Present invention is directed to a cable clamp device of the type in which a spring-driven wedge or pawl mounted within the device acts to permit movement of the cable in a first direction but clamps the cable against movement in an opposite direction.

PRIOR ART

The patent literature is replete with cable clamp devices comprised of housings having one or more through-going passages. In these devices, a wedge member is spring-urged towards an inclined wall within the passage. A cable interposed between the inclined wall and the spring-pressed pawl or wedge is free to move in a direction which would tend to increase the spacing between the wedge and the inclined wall portion. Attempted movement of the cable in a direction tending to urge the wedge toward the inclined wall results in the cable being securely clamped between the wedge and inclination.

Representative examples of clamp devices operating on the above-described principle are as follows: U.S. Pat. Nos. 5,147,145; 6,003,210; 6,058,574; 4,935,993; 4,266,756; 4,216,568; 4,129,927; 2,983,012; 3,927,3441; 2,387,436; 1,811,942; 1,271,912; 1,139,595; 1,139,515; and 15,290.

While the above-referenced patents provide a variety of means for effectively clamping cables within a housing or clamping a pair of cables against each other, a problem has existed in respect of releasing a clamped cable from a clamp device. More particularly, it has been observed that a cable component which has been clamped over extended periods, or a cable clamped under high tensile forces involves a difficult problem to effect release of the clamped cable. In some instances, the pawl or wedge becomes embedded into the clamped cable with consequent deformation of the cable rendering retraction of the wedge to a cable release position extremely difficult.

Certain of the prior art references cited above incorporate attempts to solve the cable release problem. By way of example 6,058,574 incorporates a rod having a hook-like internal portion which engages an undercut in the pawl mechanism whereby the pawl may be retracted by pulling on the rod. Such a solution may be effective where only limited forces are necessary to retract the wedge. Moreover, the device of the subject patent involves providing them with complex machined elements which are difficult to assemble.

SUMMARY OF THE INVENTION

The present invention is directed to an improved cable clamp device characterized in that the housing for the clamp may comprise a simple casting and assembly of the clamp components to the casting is easily accomplished. The invention is further directed to a cable clamp of the spring-driven wedge type wherein release of a clamped cable may be readily effected with the use of a simple tool such as a pair of pliers.

Still more particularly, the invention is directed to a cable clamp having a through-passage for a cable, a wedge and a spring within the passage, the spring pressing the wedge toward a clamp surface within the housing. A characterizing feature of the invention resides in the provision of a slot in the housing which communicates with the passage. A spring has a first end biased against an abutment at the end of the passage, the opposite side of the spring bearing against the wedge. Assembly of the components is effected by the simple process of passing a retraction pin through the slot in the housing and into a blind bore formed in the wedge. It will thus be appreciated that the simple process of inserting a pin through the slot and press fitting the pin into a blind bore in the wedge completes the assembly process. It will further be appreciated that release of a cable may be readily effected by engaging one jaw of the pliers with the projecting pin and the other jaw with an external portion of the housing, whereby a compressive force sufficient to release the clamped cable may be readily applied. The projection or pin while movable in the slot prevents disassembly of the parts by the engagement of the pin against a limit or end portion of the slot.

It is accordingly an object of the invention to provide a cable clamp incorporating a minimum number of components parts which are susceptible of easy assembly. A further object of the invention resides in providing a clamp of the type described wherein release of the clamped cable may be readily effected notwithstanding the cable has been clamped for protracted periods and/or has been subjected to high tensioning forces on the cable which tend to distort the cable component.

Still other and further objects will appear herein or be hereinafter pointed out in the course of the detailed description of the device.

DETAILED DESCRIPTION OF THE VIEWS

FIG. 1 is a perspective view of a cable clamp in accordance with the invention.

FIG. 2 is a magnified section taken on the line 2—2 of FIG. 1 and illustrating the simplified assembly procedures.

FIG. 3 is a section taken on the line 3—3 of FIG. 2.

FIG. 5a is a side elevational view depicting a tool, namely pliers, in position for releasing a clamped cable.

DETAILED DESCRIPTION OF THE DRAWINGS

Figure 4:
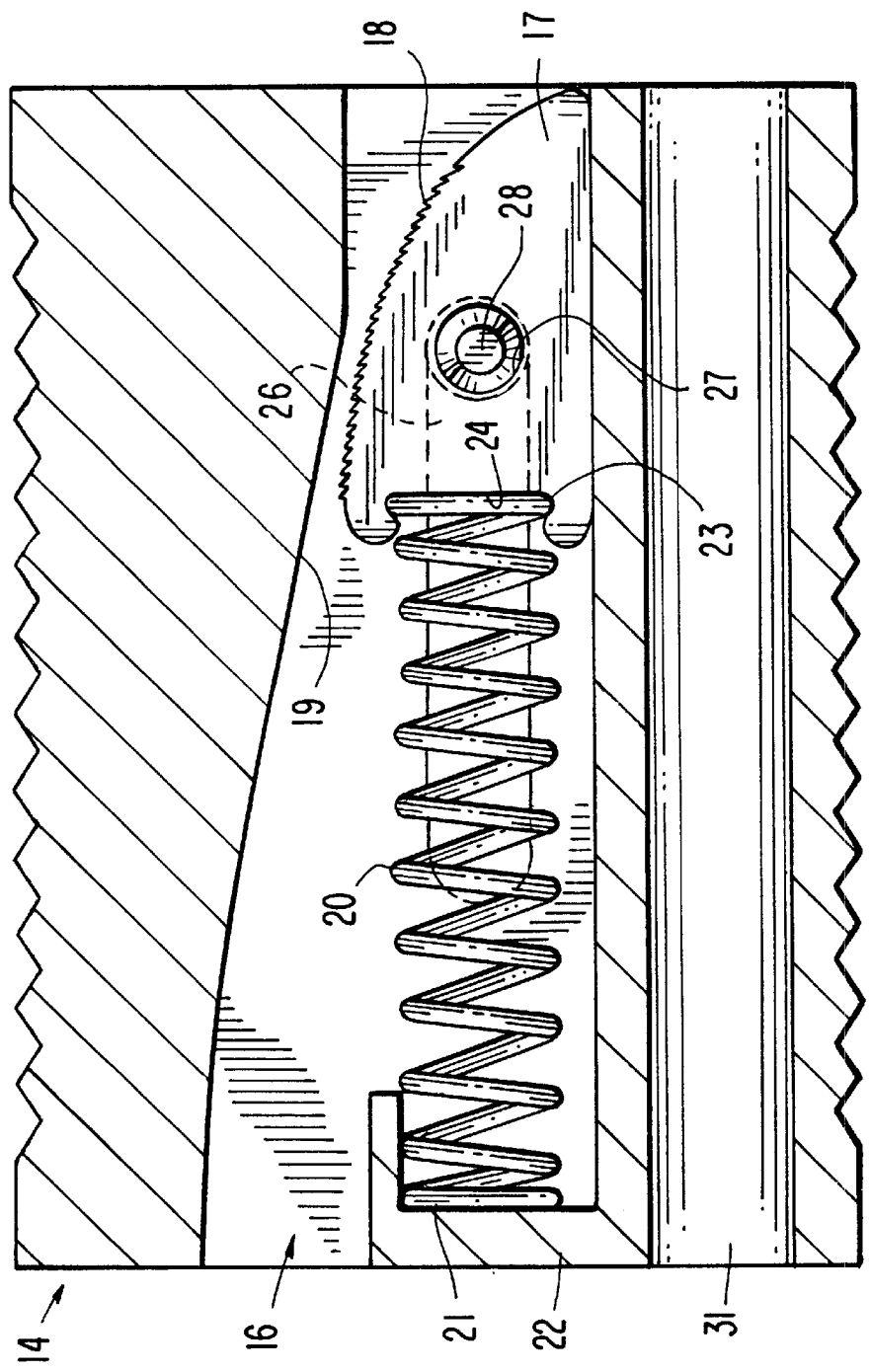
FIG. 4 is a fragmentary magnified section taken on line 4—4 of FIG. 2.

In FIG. 1 there is disclosed a cable clamp in accordance with the invention. The specific device of FIG. 1 in fact comprises two separate cable devices in side by side parallel relationship, namely a first clamp assembly 10 and a second identical clamp assembly 11 (FIG. 2), that is to say, if the device were severed along the dash line 13 of FIG. 2 there would be provided two identical clamp assemblies. It is to be understood that the clamp of the invention may comprise a single clamp as well as the double structure illustrated.

The clamp device comprises a housing 14 which desirably is formed of a single casting. As will become apparent from the description ensuing, the use of a unitary cast housing is made possible due to the novel construction and assembly method of the device.

The housing includes two clamping passages 15, 16, the passage 15 permitting movement of a cable in the left to right direction of FIG. 1 but preventing movement of the cable in a right to left direction. The passage 16 is oppositely arranged, i.e., a cable inserted may be shifted from right to left but will clamp against movement of a cable through the passage in a left to right direction.

As best seen in FIG. 3, there is disposed in passage 15 a wedge member 17 having a toothed wedging surface 18. The wedge member 17 is slidably mounted within passage 15 toward and away from an inclined clamp surface 19 formed in the passage. A spring member 20 includes a first end 21 bearing against end wall 22 of the housing. The opposite end 23 of the spring bears against the rear surface 24 of The wedge 17.

The housing includes a slot 26 aligned with and entering into the passage 15. The wedge 17 includes a blind bore 27 aligned with slot 26.

Assembly is completed by forcing lock pin 28 into the bore 27 of the wedge. The assembly sequence is illustrated in FIG. 2 wherein pin 28 is shown in dash lines prior to assembly and in solid lines in the assembled condition. Movement of the spring and wedge outwardly of the passage is prevented by engagement of the pin against an end of the slot.

Optionally but preferably the housing includes throughgoing clearance passages 30, 31, enabling a cable to be looped as illustrated by the arrows 32, 33 of FIG. 1.

Figure 6:
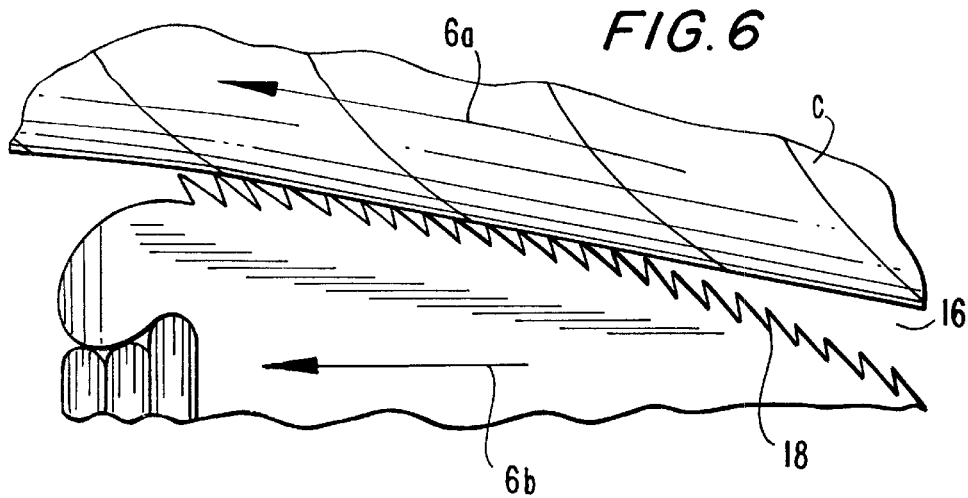
FIGS. 6, 7 and 8 are enlarged views illustrating the position of a clamping wedge showing the position of the parts, respectively, in a cable inserting position (FIG. 6), a cable clamped position (FIG. 7), and the cable release position (FIG. 8).
Figure 7:
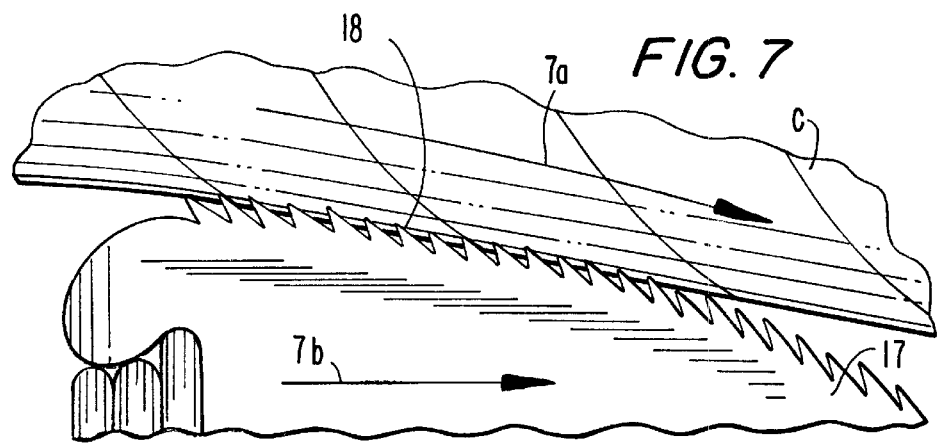
Figure 8:
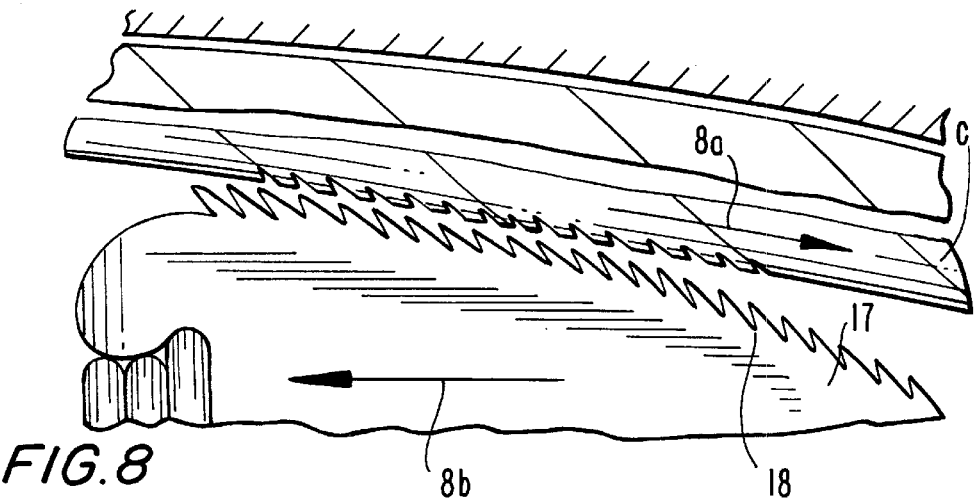

Referring now to FIGS. 6 through 8 it will be perceived that in FIG. 6 a cable C may be advanced through passage 16 in the direction of arrow 6a the inserting movements shifting wedge 17 in the direction of arrow 6b the teeth of the wedge being thereby spaced from clamp surface 19 to permit passage of the cable.

FIG. 7 discloses the position of the parts when a pulling force is exerted on the cable in the direction of arrow 7a. The pulling force will result in a concomitant shift of the wedge in the direction of arrow 7b with the result that a cable will be compressed between the wedge and clamp surface 19 of the passage. The teeth 18 of the wedge will bite into the surface of the cable C to a greater or lesser degree dependent upon the force applied to the cable. In the configuration of FIG. 7, movement of the cable in the direction of arrow 7a is precluded.

In FIG. 8, cable C is free to move in the direction of arrow 8a or in the opposite direction since the wedge 17 has been manually shifted in the direction of arrow 8b thus providing clearance between the wedge 17 and surface 19 within the passage.

Figure 5:
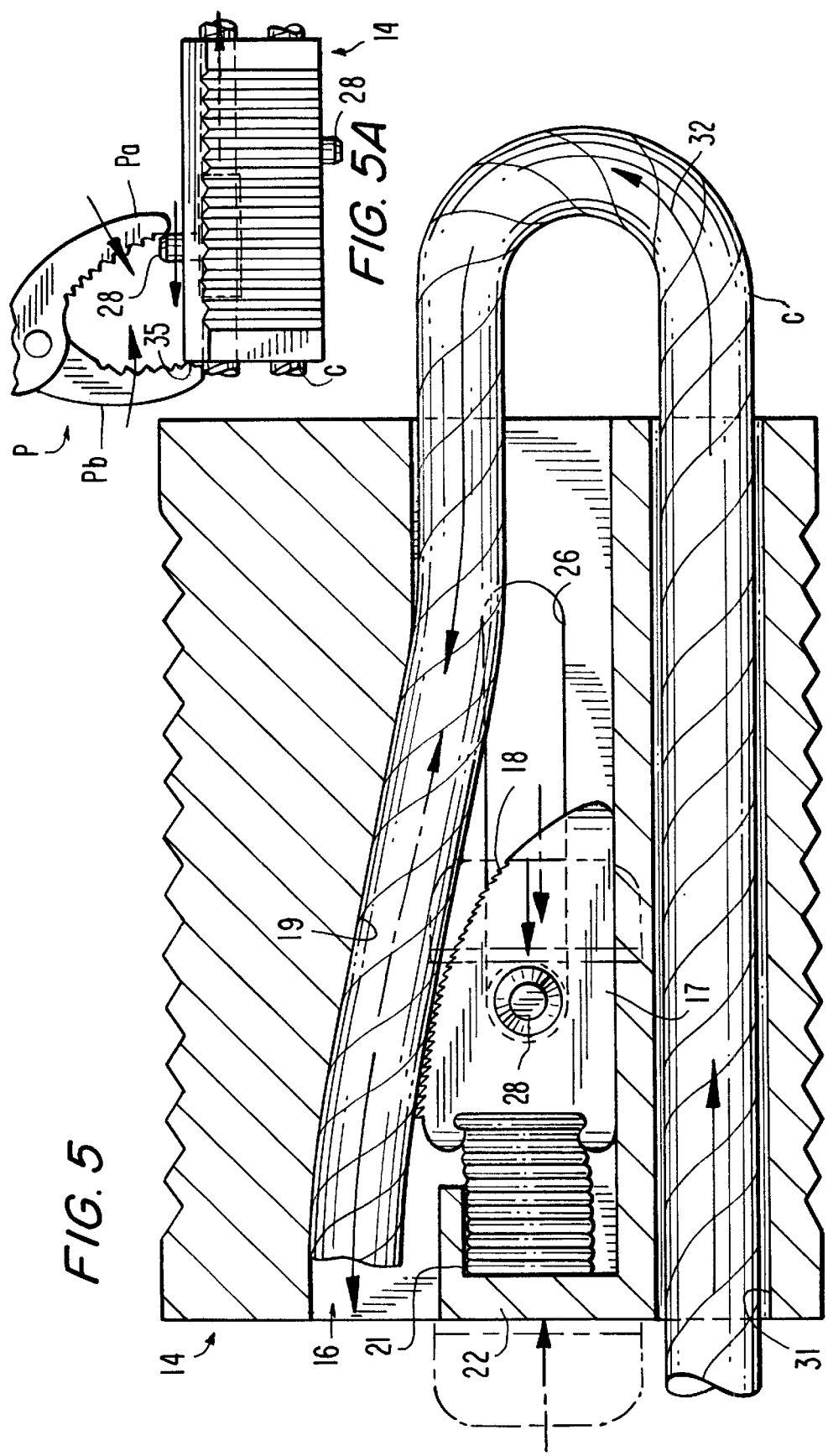
FIG. 5 is a magnified fragmentary vertical sectional view through the clamp assembly with a cable inserted in the device.

A significant advance of the present invention resides in the manner in which wedge 17 may be shifted from the position of FIG. 7 to the position of FIG. 8. Referencing FIG. 5a there is disclosed a pliers P, the jaws Pa and Pb of which are engaged, respectively, against a head portion of locking pin 28 and an abutment 35 at the edge of the housing. By applying a compressive force against the locking pin, the wedge 17 is cleared from the cable enabling movement of the cable in the direction 8a (FIG. 8). It is feasible where very high cable tensions are likely to be encountered, to provide a device with a modified housing wherein the abutment 35 is raised from the surface of the housing to be in the same plane as the pin whereby the jaws of the pliers are in alignment rather than canted as illustrated in FIG. 5a.

A further significant advantage of the clamp of the invention resides in the ability to utilize the same in connection with rope or other soft materials not having the stiffness of metal cables. More particularly, the pin 28 may be manually retracted allowing free passage of the rope.

While the device of the invention has been illustrated in conjunction with a housing having two longitudinally directed passages, and two clamp-free passages, it is altogether possible to utilize a single clamp passage and through passage arrangement.

From the foregoing it will be appreciated that there is provided in accordance with the invention a wedge type cable clamp characterized in that release of a clamped cable may be readily effected notwithstanding high tensions applied to the cable or instances in which the clamp has become embedded into the clamped cable.

A further advance of the invention resides in the facility with which the same may be assembled. More specifically, it is merely necessary first to insert a spring into the cable passage, thereafter insert the wedge into such passage, and finally to press fit the locking pin into the bore within the wedge by passing the pin through the lateral slot in the housing and into the bore.

As will be apparent from the foregoing, numerous details of construction may be modified without departing from the spirit of the invention. Accordingly, the invention is to be broadly construed within the scope of the appended claims.

What is claimed is:

1. In a ready assemble ready release cable clamp having a housing, a cable passage extending through said housing, a clamp wedge slidably disposed within said passage, for movement along a predetermined path, said wedge including a grip surface, a clamp surface in said passage disposed at an acute angle relative to said path, and spring means in said passage biased between said housing and said wedge for yieldingly urging said grip surface toward said clamp surface, the improvement which comprises an elongate slot formed in said housing in alignment with said path, a release projection on said wedge, said projection being slidably disposed within and extending outwardly through said slot, movement of said wedge toward said clamp surface being limited by engagement of said projection and an end portion of said slot, to thereby maintain said clamp surface and said grip surface in mutually spaced relation, an abutment on said housing aligned with said path, said projection being interposed between said grip surface and said abutment whereby said wedge is shifted away from said clamp surface responsive to compressive forces exerted between said abutment and said projection.

2. A cable clamp in accordance with claim 1 wherein said wedge includes a laterally directed blind bore, said bore being oriented perpendicular to said path and in alignment with said slot, said projection comprising a release pin having a first end permanently and fixedly mounted in said bore and a second end extending outwardly through said slot, engagement of said pin and said end of said slot forming the sole means maintaining said wedge in said housing.

3. A cable clamp in accordance with claim 2 wherein said release pin is press fittedly mounted in said bore.

4. The method of manufacturing a cable clamp comprising an integral housing having a cable passage, a clamp surface in said passage, a wedge movably mounted in said passage, spring means biased against said wedge for urging said wedge toward said clamp surface, a slot formed in said housing opening into and aligned with said passage, a blind bore in said wedge, and a release pin, said method comprising the steps of shifting said bore into alignment with said slot and thereafter inserting said pin through said slot into permanent mounted engagement with said bore, engagement of said pin with an end portion of said slot forming the sole means retaining said wedge in said housing.

5. Method in accordance with claim 4 and including the step of press fittedly connecting said pin to said bore.

* * * * *